(12) United States Patent
Ozawa et al.

(10) Patent No.: US 12,056,129 B2
(45) Date of Patent: Aug. 6, 2024

(54) COMPUTER SYSTEM AND QUERY PROCESSING METHOD

(71) Applicant: Hitachi, Ltd., Tokyo (JP)

(72) Inventors: Mayuko Ozawa, Tokyo (JP); Satoru Watanabe, Tokyo (JP); Norifumi Nishikawa, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/113,154

(22) Filed: Feb. 23, 2023

(65) Prior Publication Data

US 2024/0054132 A1 Feb. 15, 2024

(30) Foreign Application Priority Data

Aug. 10, 2022 (JP) .................................. 2022-128101

(51) Int. Cl.
*G06F 16/30* (2019.01)
*G06F 11/34* (2006.01)
*G06F 16/22* (2019.01)
*G06F 16/2455* (2019.01)

(52) U.S. Cl.
CPC ...... *G06F 16/2456* (2019.01); *G06F 11/3433* (2013.01); *G06F 16/2255* (2019.01)

(58) Field of Classification Search
CPC .......................... G06F 16/2456; G06F 16/2255
See application file for complete search history.

(56) References Cited

U.S. PATENT DOCUMENTS

| | | | |
|---|---|---|---|
| 9,501,527 B1* | 11/2016 | Chainani | G06F 16/24544 |
| 9,767,149 B2* | 9/2017 | Ozcan | G06F 16/24532 |
| 2018/0232417 A1* | 8/2018 | Das | G06F 16/24542 |
| 2021/0049173 A1 | 2/2021 | Chen | |
| 2021/0173581 A1* | 6/2021 | Uno | G06F 3/067 |
| 2023/0214225 A1* | 7/2023 | Kaldewey | G06F 16/2255 |
| | | | 712/225 |

* cited by examiner

*Primary Examiner* — Khanh B Pham
(74) *Attorney, Agent, or Firm* — MATTINGLY & MALUR, PC

(57) ABSTRACT

The processing load for joining a plurality of tables by hash join is reduced for a computer system in which the CPU of a node creates a partial bloom filter that manages a first table hash value of a joining key of a row corresponding to a query in an assigned row of a build table. An integrated bloom filter is created from a plurality of partial bloom filters, and a second table hash value of the joining key of the row corresponding to the condition of the query among the rows of a probe table is calculated. The row of the probe table is transmitted to the node containing a row of the build table of the join hash value for that row when the integrated bloom filter includes an identical first table hash value, and an integrated joined table is created and returned to the query request source.

6 Claims, 16 Drawing Sheets

FIG.2

SQL:
SELECT O_orderdate, L_itemnumber
FROM Order, Lineitem
WHERE O_orderdate < 2000-1-1 AND O_orderkey = L_orderkey Determine whether New Data is included in learning data

FIG.6

| Table name | Number of rows (rows) | Size(GB) |
|---|---|---|
| ORDER | 1000000 | $10^1$ |
| LINEITEM | $10^{11}$ | $10^4$ |

FIG.7

| Table name | Table information |
|---|---|
| ORDER | O_orderdate, O_orderkey |
| LINEITEM | L_itemnumber, L_orderkey |

FIG.8

Hash table for build table join 173

| Hash value (173a) | O_orderdate (173b) | O_orderkey (173c) |
|---|---|---|
| 1 | 1999/10/09 | 101 |
| 2 | 1999/11/07 | 505 |
| 5 | 1999/11/11 | 378 |
| | ⋮ | ⋮ |

FIG.9

Hash table for probe table join 174

| Hash value (174a) | L_itemnumber (174b) | L_orderkey (174c) |
|---|---|---|
| 1 | 301 | 101 |
| 2 | 597 | 505 |
| 4 | 205 | 1266 |
| | ⋮ | ⋮ |

FIG.16

Per-node bloom filter (node 1)   162(162-1)

| 162a | 1 | 2 | 3 | 4 | 5 | ... | | | | 150 |
|---|---|---|---|---|---|---|---|---|---|---|
| 162b | 1 | 1 | 0 | 0 | 1 | | | | | 1 |

Per-node bloom filter (node 2)   162(162-2)

| 151 | 152 | 153 | 154 | 155 | ... | | | | 300 |
|---|---|---|---|---|---|---|---|---|---|
| 0 | 0 | 1 | 0 | 1 | | | | | 1 |

Per-node bloom filter (node 3)   162(162-3)

| 301 | 302 | 303 | 304 | 305 | ... | | | | 450 |
|---|---|---|---|---|---|---|---|---|---|
| 0 | 0 | 1 | 0 | 1 | | | | | 1 |

COMPUTER SYSTEM AND QUERY PROCESSING METHOD

CROSS-REFERENCE TO PRIOR APPLICATION

This application relates to and claims the benefit of priority from Japanese Patent Application No. 2022-128101 filed on Aug. 10, 2022, the entire disclosure of which is incorporated herein by reference.

BACKGROUND

The present disclosure relates to a technique for a processing query related to a plurality of tables.

Join processing that joins two tables is often performed using a database. In the join processing, of the two tables to be joined, the table with the smaller size is called a "build table" and the table with the larger size is called a "probe table." For example, hash join is known as the join processing. In hash join, the build table is read and filtered to calculate hash values, thereby creating a hash table of the build table. Then, the probe table is read and filtered to calculate hash values, and the hash table of the build table is matched with the hash table of the probe table, and the tables are joined. In this manner, in the matching with the hash table of the build table, if the computer system has a multi-node configuration, it is necessary to transfer the hash values of the probe table to the node that has the hash table of the build table that manages the corresponding values, and this results in an increase of communication cost between the nodes.

In contrast, there is a known technique that reduces the load of the joining processing by using a bloom filter that determines whether or not data to be matched exists in the node during the table joining processing (see, for example, U.S. Patent Application Publication No. 2021/049173).

SUMMARY

In the technique disclosed in U.S. Patent Application Publication No. 2021/0049173, at the time of hash join, bloom filters of both the build table and the probe table is created at each node at the same time, and each bloom filter is periodically replaced and updated. Then, the rows filtered by applying bloom filters need to be cached, and when the bloom filters are updated, the rows need to be applied to the bloom filters again. Therefore, the same row must be subjected to the bloom filter several times, which causes a problem of processing load.

The present disclosure has been made in view of the foregoing circumstances, and an object thereof is to provide a technique capable of reducing the processing load produced when joining a plurality of tables by means of hash join.

In order to achieve the foregoing object, a computer system according to one aspect is a computer system that includes a storage configured to store a plurality of tables, and a plurality of nodes configured to process a query related to the plurality of tables, wherein the query is a query for joining fields of the plurality of tables according to a value of a predetermined joining key, and a processor of each node of the plurality of nodes is configured to create a bloom filter that manages information on a first table hash value, which is a hash value of a first type corresponding to a joining key of a row that corresponds to a condition of the query in rows assigned to a node in a first table having the smallest size out of tables to be joined, integrate a plurality of bloom filters created at the plurality of nodes to create an integrated bloom filter that manages the information on the first table hash value corresponding to the joining key of the row corresponding to the condition of the query in all the rows of the first table, calculate a second table hash value, which is a hash value of the first type corresponding to the joining key of the row corresponding to the condition of the query in rows of a second table different from the first table to be joined, and when there exists in the integrated bloom filter the first table hash value identical to the calculated second table hash value, specify a node, out of the plurality of nodes, that stores the rows of the first table of the hash value of the second type, based on the hash value of the second type of data of the row of the second table, and transmit the data of the row of the second table to the node, and when the data of the row of the second table is received from another node, create a joined table by joining a field designated by the query of the row of the second table and a field designated by the query of the row of the first table corresponding to the hash value of the second type identical to the hash value of the second type of the row of the second table, and a processor of any node of the plurality of nodes is configured to integrate a plurality of joined tables created at respective nodes and return an integrated joined table to a request source of the query.

According to the present disclosure, the processing load incurred at the time of joining a plurality of tables by hash join can be reduced.

BRIEF DESCRIPTION OF THE DRAWINGS

FIG. 2 is a diagram showing an example of a configuration of a query according to a first embodiment;

FIG. 6 is a configuration diagram of table statistical information according to the first embodiment;

FIG. 7 is a configuration diagram of table storage information according to the first embodiment;

FIG. 8 is a configuration diagram of a hash table for build table join according to the first embodiment;

FIG. 9 is a configuration diagram of a hash table for probe table join according to the first embodiment;

FIG. 16 is a configuration diagram of a per-node bloom filter according to a second embodiment;

DETAILED DESCRIPTION OF THE EMBODIMENT

Embodiments are now described with reference to the drawings. It should be noted that the embodiments described hereinafter are not to limit the present invention according to the claims, and all of the elements and combinations thereof described in the embodiments are not necessarily essential to the means for solution of the present invention.

In the following description, information may be described in terms of "AAA tables," but information may also be expressed in any data structure. In other words, the "AAA table" can be called "AAA information" to indicate that the information is independent of the data structure.

The following description explains processing with a "program" as the subject of the operation, but since the program may be executed by a processor (e.g., CPU (Central Processing Unit)) to perform defined processing, as appropriate, using a storage unit (e.g., memory) and/or an interface (e.g., port), the program may be the subject of the operation of the processing. The processing described with a program as the subject of the operation may also be processing performed by a processor or a computer (e.g., server) having the processor. The system may also include a hardware circuit that performs some or all of the processing performed by the processor. The program may also be installed from a program source. The program source may be, for example, a program distribution server or a computer-readable (e.g., non-transitory) recording medium. In the following description, two or more programs may be realized as one program, or one program may be realized as two or more programs.

Figure 1:
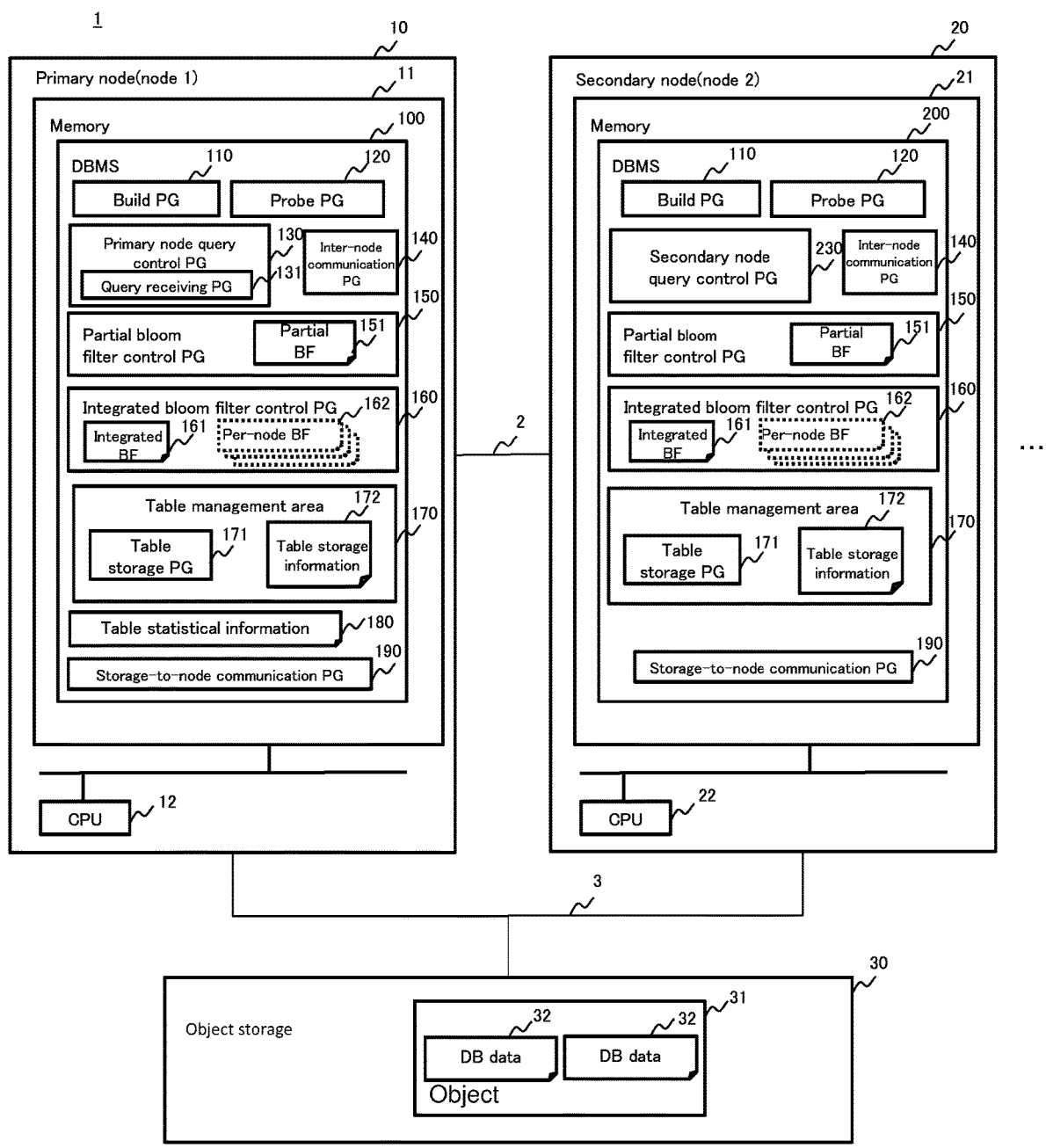
FIG. 1 is an overall configuration diagram of a computer system according to embodiments.

FIG. 1 is an overall configuration diagram of a computer system according to an embodiment.

A computer system 1 includes a primary node 10, one or more secondary nodes 20, and an object storage 30. The primary node 10 and the secondary node 20 are coupled via a network 2. The primary node 10, the secondary nodes 20, and the object storage 30 are coupled via a network 3.

The primary node 10 and the secondary nodes 20 constitute a distributed database by using a storage area of the object storage 30.

The primary node 10 accepts a query to the database from a user terminal, not shown, executes processing together with secondary nodes 20 according to the query, and returns the processing result to the user terminal.

The primary node 10 includes a memory 11 and a CPU 12 as an example of a processor. The CPU 12 executes various types of processing according to a program stored in the memory 11. The memory 11 is, for example, a RAM (RANDOM ACCESS MEMORY), which stores programs executed by the CPU 12 and other necessary information.

The memory 11 stores a DBMS (database management system) 100. The DBMS 100 includes a build program (in the diagram, the program may be referred to as PG) 110, a probe program 120, a primary node query control program 130, an inter-node communication program 140, a partial bloom filter control program 150, an integrated bloom filter control program 160, a table management area 170, table statistical information 180, and storage-to-node communication program 190.

The build program 110 is executed by the CPU 12 to perform various types of processing related to a build table (first table). The probe program 120 is executed by the CPU 12 to execute various types of processing related to a probe table (second table). The primary node query control program 130 is executed by the CPU 12 to control processing as the primary node 10 to execute a query. The processing as the primary node 10 includes processing of distributing execution of a query to its own node and the secondary nodes 20 for execution. The primary node query control program 130 includes a query receiving program 131. The query receiving program 131 is executed by the CPU 12 to receive queries from user terminals.

The inter-node communication program 140 is executed by the CPU 12 to enable communication between the primary node 10 and the secondary nodes 20.

The partial bloom filter control program 150 is executed by the CPU 12, to execute processing of creating a partial bloom filter 151 and managing and using the partial bloom filter.

The integrated bloom filter control program 160 is executed by the CPU 12, to execute processing of creating an integrated bloom filter 161 and managing and using the integrated bloom filter 161.

The table management area 170 is an area for managing tables stored in the object storage 30, and stores a table storage program 171 and table storage information 172.

The table storage program 171 is executed by the CPU 12 to store tables read from the object storage 30 in the memory 11. The table storage information 172 stores information (e.g., a part of a table, etc.) of the tables stored in the object storage 30.

The table statistical information 180 stores statistical information of the tables stored in the object storage 30.

The storage-to-node communication program 190 is executed by the CPU 12 to enable communication with the object storage 30.

The secondary node 20 accepts a query from the primary node 10, execute processing according to the query, and return the processing results to the primary node 10.

The secondary node 20 includes a memory 21 and a CPU 22 as an example of a processor. The CPU 22 executes various types of processing according to a program stored in the memory 21. The memory 21 is, for example, a RAM, which stores a program executed by the CPU 22 and other necessary information.

The memory 21 stores a DBMS 200. The DBMS 200 includes the build program 110, the probe program 120, a secondary node query control program 230, the inter-node communication program 140, the partial bloom filter control program 150, the integrated bloom filter control program 160, the table management area 170, and the storage-to-node communication program 190. Here, the configuration in the memory 21 with the same reference signs as those of the memory 11 of the primary node 10 is the same or similar to the configuration of the memory 11. The information stored in the partial bloom filter 151 is not identical, but corresponds to the respective states of the primary node 10 and the other secondary nodes 20.

The secondary node query control program 230 is executed by the CPU 22 to control the processing as secondary node 20 to execute a query. The processing as secondary node 20 includes processing of executing a query sent from the primary node 10 and returning the result of the execution of the query to the primary node 10.

The object storage 30 includes a storage device, not shown, that stores data such as tables managed by the DBMS (DB data 32) as an object 31.

Next, the query sent from user terminal to the primary node 10 is described.

FIG. 2 is a diagram showing an example of a configuration of a query according to a first embodiment.

This query is a query to perform hash join in SQL format, meaning that fields (items) of O_orderdate and L_itemnumber for which O_orderdate is earlier than 2000-1-1 (an example of selection condition) and O_orderkey and L_orderkey are identical are selected from an Order table and a Lineitem table listed in a FROM clause (tables to be joined) and joined. In this query, O_orderkey and L_orderkey are the joining keys.

Next, the creation and use of bloom filters such as the partial bloom filter 151 and the integrated bloom filter 161 will be described.

Figure 3:
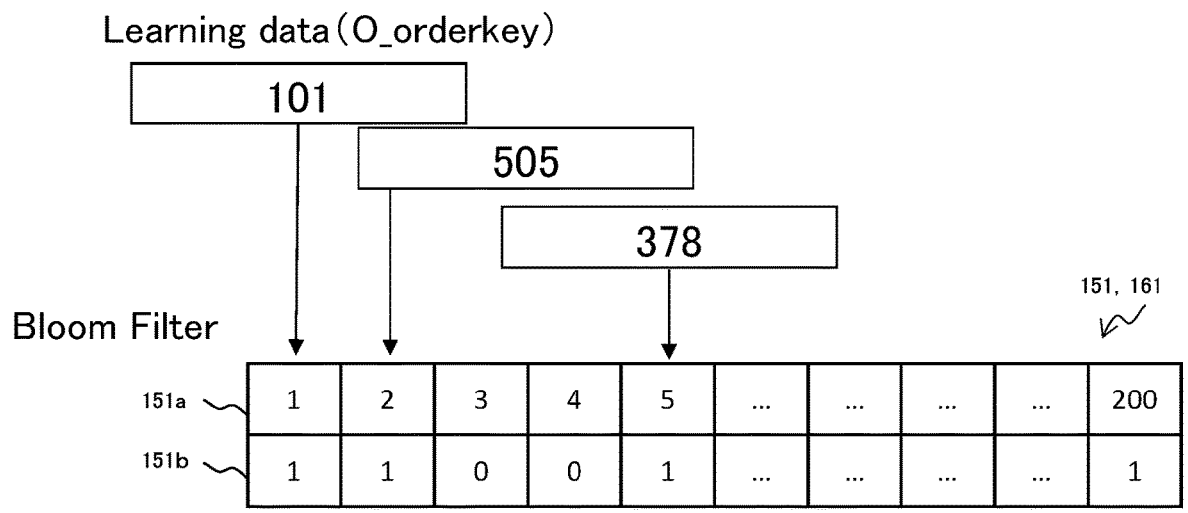
FIG. 3 is a diagram for explaining creation of a bloom filter according to the first embodiment.
Figure 4:
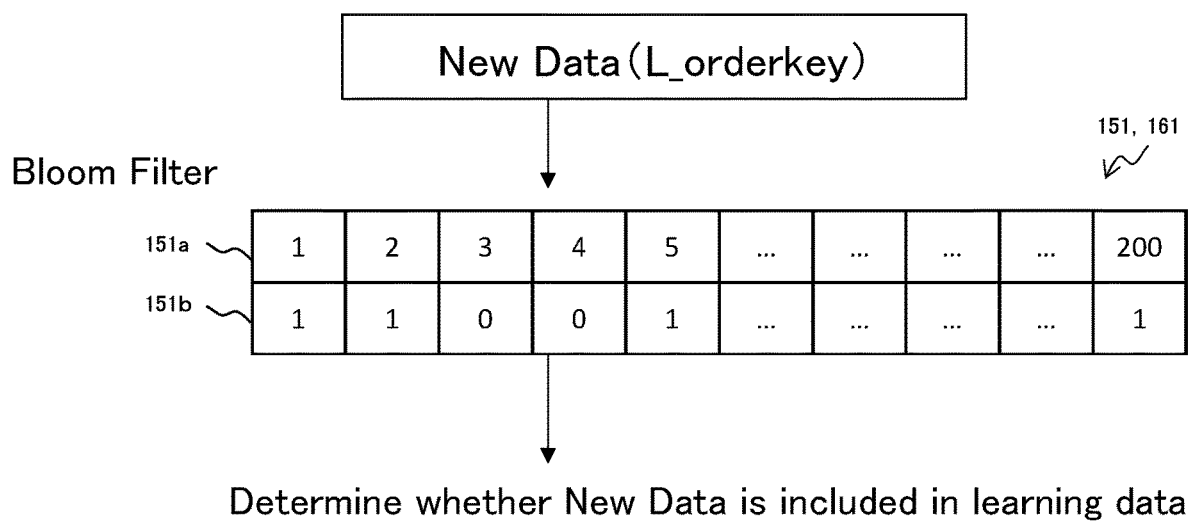
FIG. 4 is a diagram for explaining use of the bloom filter according to the first embodiment.

FIG. 3 is a diagram for explaining creation of a bloom filter according to the first embodiment. FIG. 4 is a diagram for explaining use of the bloom filter according to the first embodiment.

A bloom filter (151, 161) includes a hash value row 151*a* that includes a bloom filter hash value (BF hash value: hash value of the first type: first table hash value) in a range that can be taken by performing a predetermined hash calculation (bloom filter hash calculation) on a value of a predetermined target item (target item: joining key) in a row (entry) of a table, and a bit row 151*b* that indicates whether or not one or more target rows (comparison target rows) contain the values of the items that are the respective values of the hash value row 151*a*. For example, if the target item of the comparison target row includes a value of an item that is a predetermined value of the hash value row 151*a*, the bit of the bit row 151*b* corresponding to that value is set to 1. Here, in the present embodiment, the bloom filter hash calculation is hash calculation that requires less computational processing load than the hash join hash calculation described below, and has a narrower range of possible hash values to be calculated. This reduces the amount of data required for a bloom filter and the processing load for hash value calculation, compared to the case where the bloom filter is managed using join hash values. The bloom filter hash calculation may be the same as the hash join hash calculation, that is, a BF hash value and the join hash value may be the same. When the partial bloom filter control program 150 or the integrated bloom filter control program 160 creates (learns) a bloom filter, hash values in the range that can be taken by the bloom filter hash calculation for a predetermined target item are prepared in advance as the hash value rows 151*a*, and the hash value from the bloom filter hash calculation for each of the target items in the comparison target row (learning data: O_orderkey in the example shown in FIG. 3) is calculated, and the bit in bit row 151*b* corresponding to the calculated hash value in the hash value row 151*a* is set to 1. For example, if the hash values by the bloom filter hash calculation are calculated to be 1, 2, and 5 for O_orderkey of 101, 505, and 378, the bits corresponding to the hash values 1, 2, and 5 are set to 1.

When the partial bloom filter control program 150 or the integrated bloom filter control program 160 uses the bloom filter, it calculates a hash value by bloom filter hash calculation of a predetermined item (confirmation target item: new data: L_orderkey in the example shown in FIG. 4) of a row whose existence is to be confirmed. The partial bloom filter control program 150 or the integrated bloom filter control program 160 refers to the bloom filter 151, 161 to specify a bit of the bit row 151*b* corresponding to the calculated hash value in the hash value row 151*a*, and determines whether or not the target item with the same hash value exists in the comparison target row by means of the value of this bit.

Next, the processing by which the integrated bloom filter control program 160 creates the integrated bloom filter 161 will be described.

Figure 5:
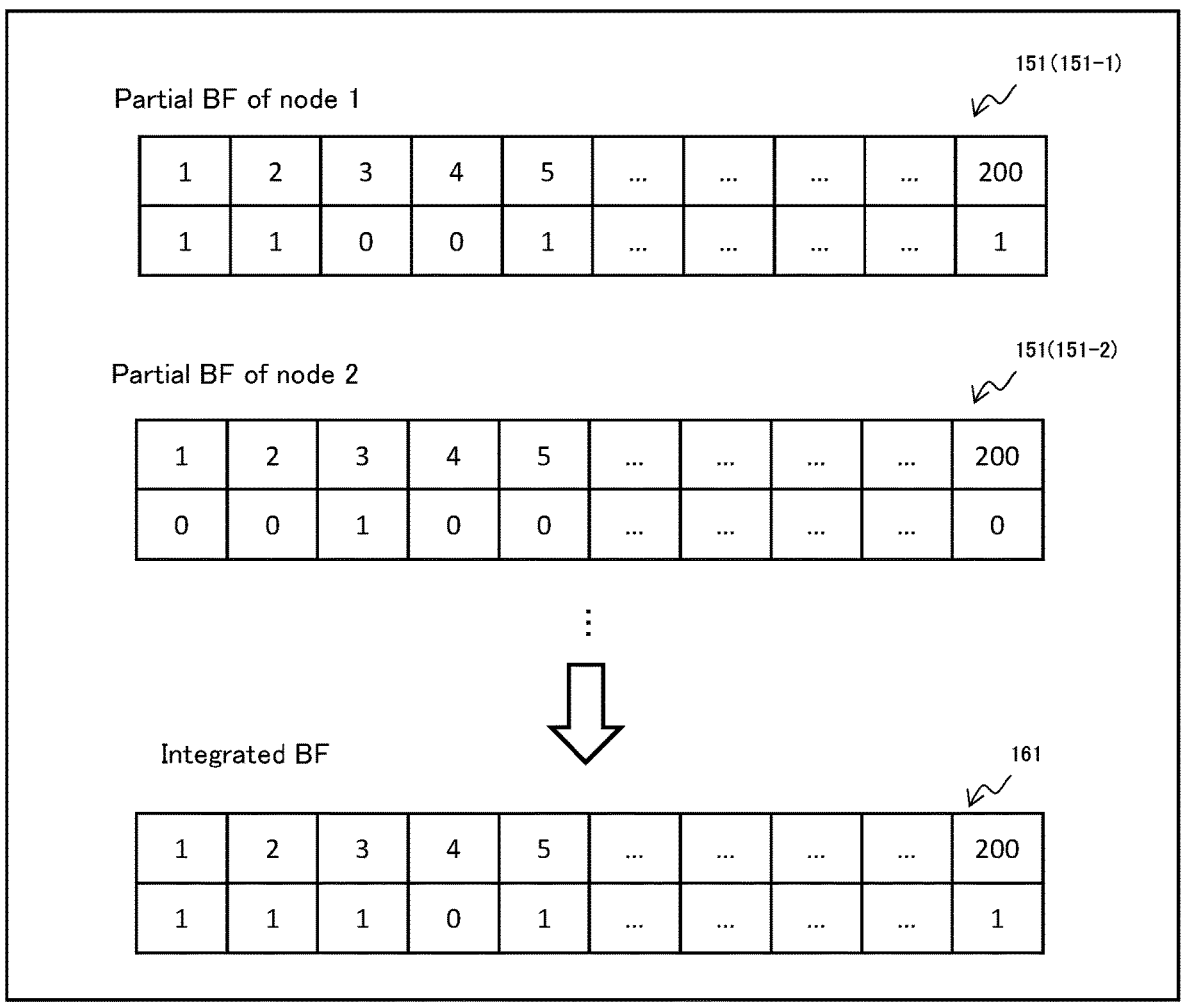
FIG. 5 is a diagram for explaining creation of an integrated bloom filter to the first embodiment.

FIG. 5 is a diagram for explaining creation of an integrated bloom filter according to the first embodiment.

The integrated bloom filter control program 160 receives partial bloom filter 151 from other nodes and creates the integrated bloom filter 161 by integrating the partial bloom filter 151 of its own node with the partial bloom filters 151 of other nodes. Specifically, the integrated bloom filter control program 160 sets the bit corresponding to the hash value whose bit is 1 in any partial bloom filter 151, to 1 in the integrated bloom filter 161. For example, if the bits corresponding to hash values 1, 2, 5, . . . 200 are 1 in a partial bloom filter 151-1 for a node 1 and the bits corresponding to hash values 3, . . . are 1 in a partial bloom filter 151-2 for a node 2, the bits corresponding to the hash values 1, 2, 3, 5, . . . 200 are set to 1 in the integrated bloom filter 161. Accordingly, the integrated bloom filter 161 indicates whether or not the target items of the values that are the respective hash values are present in the comparison target row of any of the nodes.

Next, the table statistical information 180 will be described.

FIG. 6 is a configuration diagram of table statistical information according to the first embodiment.

The table statistical information 180 manages the statistical information of each table (table) managed by the DBMS 100, 200, and stores a row (entry) for each table. Each piece of table statistical information 180 can be specified by referring to the DB data 32 of the object storage 30. Rows of the table statistical information 180 store the items of a table name 180*a*, the number of rows 180*b*, and a size 180*c*.

The table name 180*a* stores the name of a table corresponding to an entry (table name). The number of rows 180*b* stores the number of rows of the table corresponding to the entry. The size 180*c* stores the data size of the table corresponding to the entry.

Next, the table storage information 172 will be described.

FIG. 7 is a configuration diagram of table storage information according to the first embodiment.

The table storage information 172 stores information on items (columns and fields) stored in each table. The table storage information 172 stores rows for each table. The rows of the table storage information 172 store the items of a table name 172*a* and table information 172*b*.

The table name 172*a* stores the name of a table corresponding to an entry (table name). The table information 172*b* stores information (e.g., item name, data type), and the like of items contained in the table corresponding to the entry.

Next, a hash table for build table join 173, a hash table for probe table join 174, and a joined table 175, which are created in the table management area 170 by executing the query, will be described.

FIG. 8 is a configuration diagram of a hash table for build table join according to the first embodiment.

The hash table for build table join 173 is a table for managing hash values for join (join hash values) for rows of the build table that satisfy the conditions of the query. FIG. 8 shows, for convenience, the integrated state of the hash tables for build table join 173, which are dispersed in the primary node 10 and the secondary node 20. In reality, a plurality of rows of the hash table for build table join 173 shown in FIG. 8 are dispersed in the primary node 10 and the secondary node 20.

The rows of the hash table for build table join 173 include items of a hash value 173*a*, O_orderdate 173*b*, and O_orderkey 173*c*.

The hash value 173*a* stores the join hash value (hash value of the second type) calculated by join hash calculation for the value of the target item (joining key) of the row of the build table corresponding to the entry. In the present embodiment, O_orderkey is the target item. The O_orderdate 173*b* stores the value of O_orderdate of the row of the build table corresponding to the entry. The O_orderkey 173*c* stores the value of O_orderkey of the row of the build table corresponding to the entry.

FIG. 9 is a configuration diagram of a hash table for probe table join according to the first embodiment.

The hash table for probe table join 174 is a table that manages join hash values of respective rows of the probe table that satisfy the conditions of the query, and stores a row corresponding to each row that satisfies the conditions. FIG. 9 shows, for convenience, the integrated state of the hash tables for probe table join 174, which are dispersed in the primary node 10 and the secondary node 20. In reality, a plurality of rows of the hash table for probe table join 174 shown in FIG. 9 are dispersed in the primary node 10 and the secondary nodes 20.

The rows of the hash table for probe table join 174 include items of a hash value 174*a*, L_itemnumber 174*b*, and L_orderkey 174*c*.

The hash value 174*a* stores the join hash value (hash value of the second type) calculated by join hash calculation for the value of the target item (joining key) of the row of the probe table corresponding to the entry. In the present embodiment, L_orderkey is the target item. The L_itemnumber 174*b* stores the value of L_itemnumber of the row of the probe table corresponding to the entry. The L_orderkey 174*c* stores the value of L_orderkey of the row of the probe table corresponding to the entry.

Figure 10:
FIG. 10 is a configuration diagram of a joined table according to the first embodiment.

FIG. 10 is a configuration diagram of a joined table according to the first embodiment.

The joined table 175 is a table that manages rows containing items of a plurality of tables that have been joined by executing a query, and stores rows (entries) containing items that have been joined by the query. Although FIG. 10 shows the final joined table that is finally joined at the primary node 10, before being joined at the primary node 10, the joined tables are dispersed in the primary node 10 and the secondary nodes 20.

Next, the processing operation for the computer system 1 of the first embodiment will be described.

Figure 11:
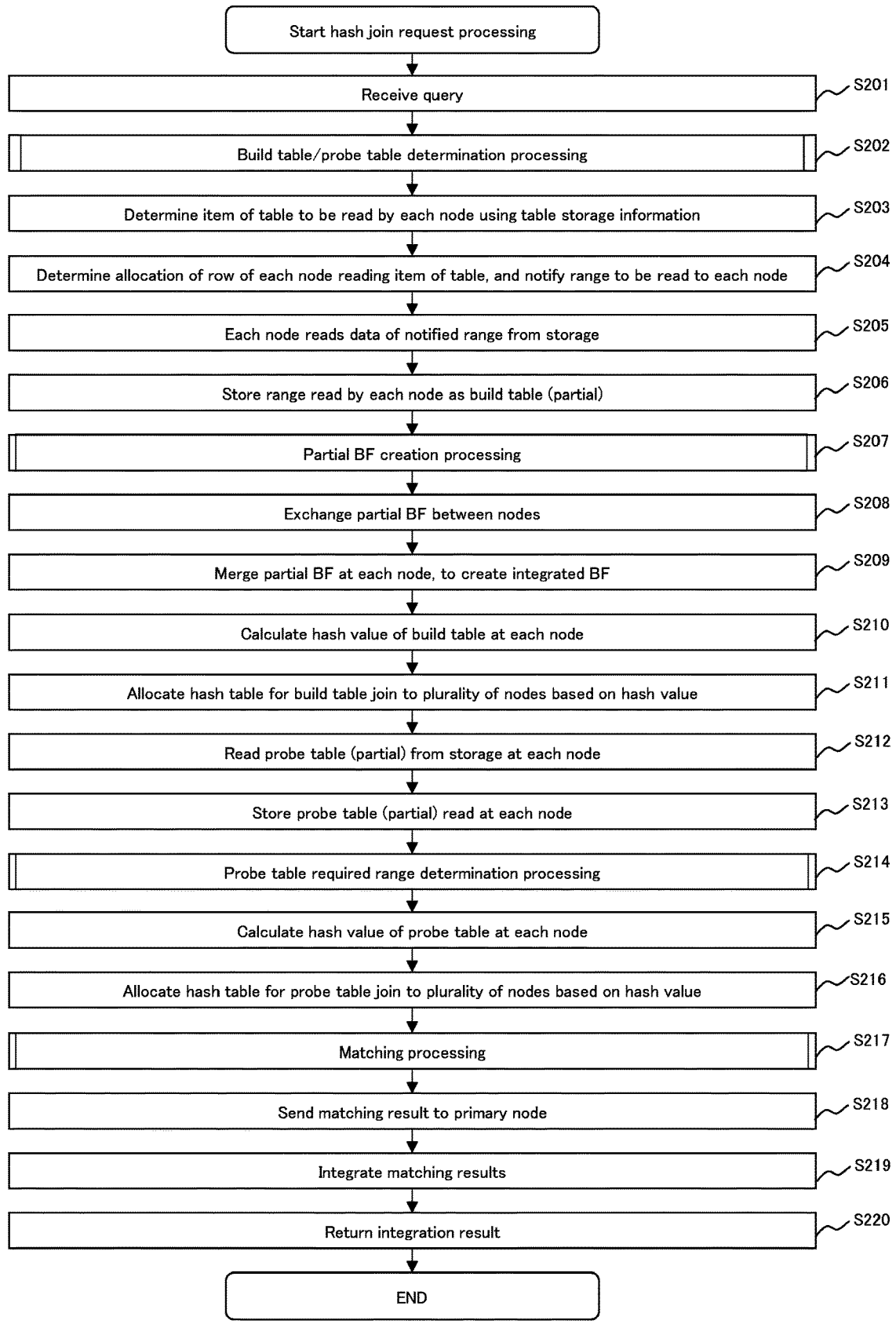
FIG. 11 is a flowchart of hash join request processing according to the first embodiment.

FIG. 11 is a flowchart of hash join request processing according to the first embodiment.

The hash join request processing is executed when a hash join query is transmitted from a user terminal to the primary node 10.

First, the query receiving program 131 of the primary node query control program 130 of the primary node 10 receives the hash join query transmitted from the user terminal (S201).

Next, the primary node query control program 130 executes build table/probe table determination processing (see FIG. 12) for determining a build table and a probe table (S202).

Next, the primary node query control program 130 determine the items of the tables (build table and probe table) to be read at each node (primary node 10 and secondary nodes 20) using the table storage information 172 (S203). Specifically, the primary node query control program 130 refers to the query and the table storage information 172 to specify the items to be acquired from the build table and the items to be acquired from the probe table.

Next, the primary node query control program 130 determines the allocation of table rows for each node to read the determined table items, and notifies each node of the range (items and rows) to be read (S204). For example, the primary node query control program 130 determines the allocation so that the number of table rows to be allocated to each node is approximately uniform.

Upon receiving the notification of the range to be read, the storage-to-node communication program 190 of each node reads the build table data in the notified range (rows and items) from the object storage 30 (S205), and stores the data of the range read by the table storage program 171 in the table management area 170 as the build table (part of the build table) (S206).

Next, the partial bloom filter control program 150 of each node executes partial bloom filter creation processing (see FIG. 13) to create a partial bloom filter by using the build table for each node (S207).

Next, the node-to-node communication program 140 of each node collects partial bloom filters of respective nodes by exchanging partial bloom filters among the nodes (S208).

Next, the integrated bloom filter control program 160 creates an integrated bloom filter by merging the partial bloom filters of all the nodes (S209).

Next, the build program 110 of each node calculates the hash value of each row of the (partial) build table of the node to create the hash table for build table join 173 (S210).

Next, the build program 110 allocates each row of the hash table for build table join 173 to a plurality of nodes by the inter-node communication program 140 on the basis of the hash value of each row (S211). Here, the build program 110, for example, distributes the rows so that the number of rows of the hash table for build table join 173 managed by each node is uniform. In the present embodiment, the build program 110 divides the range of possible join hash values by the number of nodes to which the rows are assigned, so that the range of join hash values (managed range) for which each node is responsible is uniform.

Next, the storage-to-node communication program 190 of each node reads, from the object storage 30, the data in the probe table of the range (rows and items) notified in step S204 (S212), and stores in the table management area 170, as a probe table (part of the probe table), the data in the range read by the table storage program 171 (S213).

Next, the integrated bloom filter control program 160 of each node executes probe table required range determination processing (see FIG. 14) for determining a required range of the probe table based on the integrated bloom filter 161 (S214). This probe table required range determination processing removes, from the probe table stored by each node, the rows of the probe table for which no row corresponding to the build table exists, thereby appropriately preventing the information of the rows of the probe table that do not satisfy the query conditions from being transmitted to other nodes.

Next, the probe program 120 of each node calculates a join hash value by join hash calculation for each row of the probe table, and creates the hash table for probe table join 174 (S215).

Next, the probe program 120 of each node allocates each row of the hash table for probe table join 174 to a plurality of nodes by the inter-node communication program 140 based on the join hash value of each row (S216).

Next, the probe program 120 of each node executes a matching processing (see FIG. 15) in which each row of the hash table for probe table join 174 is matched with the hash table for build table join 173 (S217).

Next, the probe program 120 of each node transmits the matching result of the matching processing, that is, a joined table including one or more rows joining the items of the build table determined to correspond by the matching processing and the items of the probe table, to the primary node 10 by the inter-node communication program 140 (S218).

Next, the probe program 120 of the primary node 10 integrates the matching results (joined table) by each node (plurality of nodes) including itself, to create an integrated result (joined table 175) (S219), returns the joined table 175 to the user terminal which is a request source of the query (S220), and ends the processing.

Next, build table/probe table determination processing (S202) is described.

Figure 12:
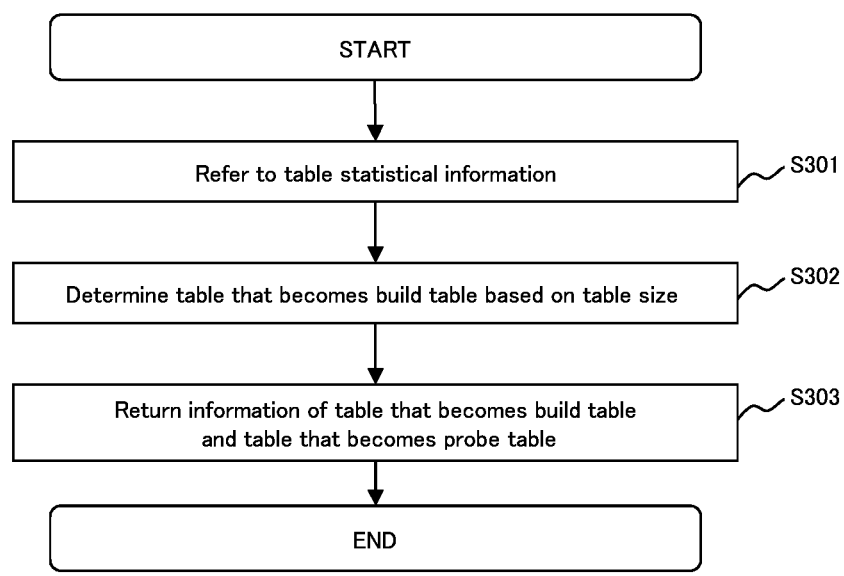
FIG. 12 is a flowchart of build table/probe table determination processing according to the first embodiment.

FIG. 12 is a flowchart of build table/probe table determination processing according to the first embodiment.

The main node query control program 130 refers to the table statistical information 180, obtains table information of the two tables (tables) which are targets of the query (S301), and determines the table with the smaller table size among the two tables as the build table and the table with the larger table size as the probe table (S302). For example, if the query targets two tables Order and Lineitem as shown in FIG. 2 and the table statistical information 180 is in the state shown in FIG. 6, Order is determined to be the build table and Lineitem is determined to be the probe table.

Next, the primary node query control program 130 returns the information of the table determined to be the build table and the table determined to be the probe table, to the hash join request processing (S303).

Next, partial bloom filter creation processing (S207) will be described.

Figure 13:
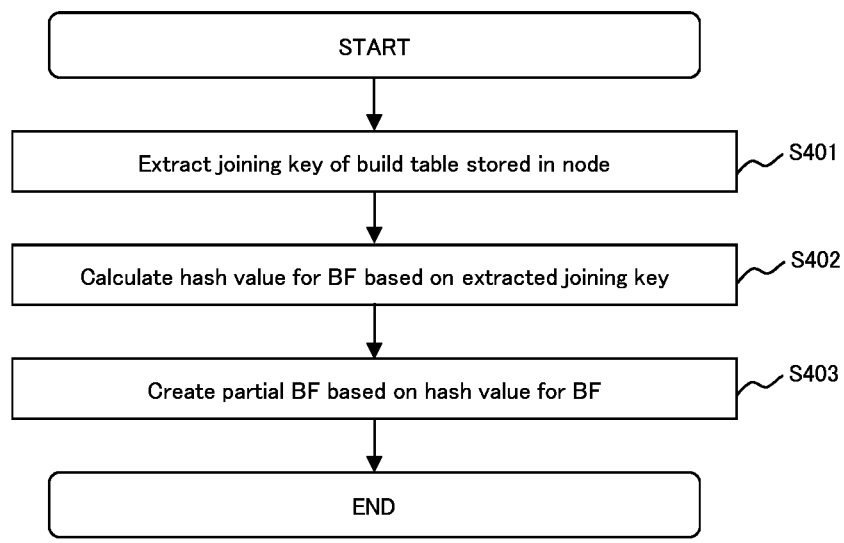
FIG. 13 is a flowchart of partial bloom filter creation processing according to the first embodiment.

FIG. 13 is a flowchart of partial bloom filter creation processing according to the first embodiment. The partial bloom filter creation processing is executed at each node.

The partial bloom filter control program 150 extracts the joining key of each row of the build table stored in its node (S401).

Next, the partial bloom filter control program 150 calculates a bloom filter hash value by performing bloom filter hash calculation on each extracted joining key (S402).

Next, the partial bloom filter control program 150 creates the partial bloom filter 151 based on the calculated bloom filter hash value (S403).

The probe table required range determination processing (S214) will be described next.

Figure 14:
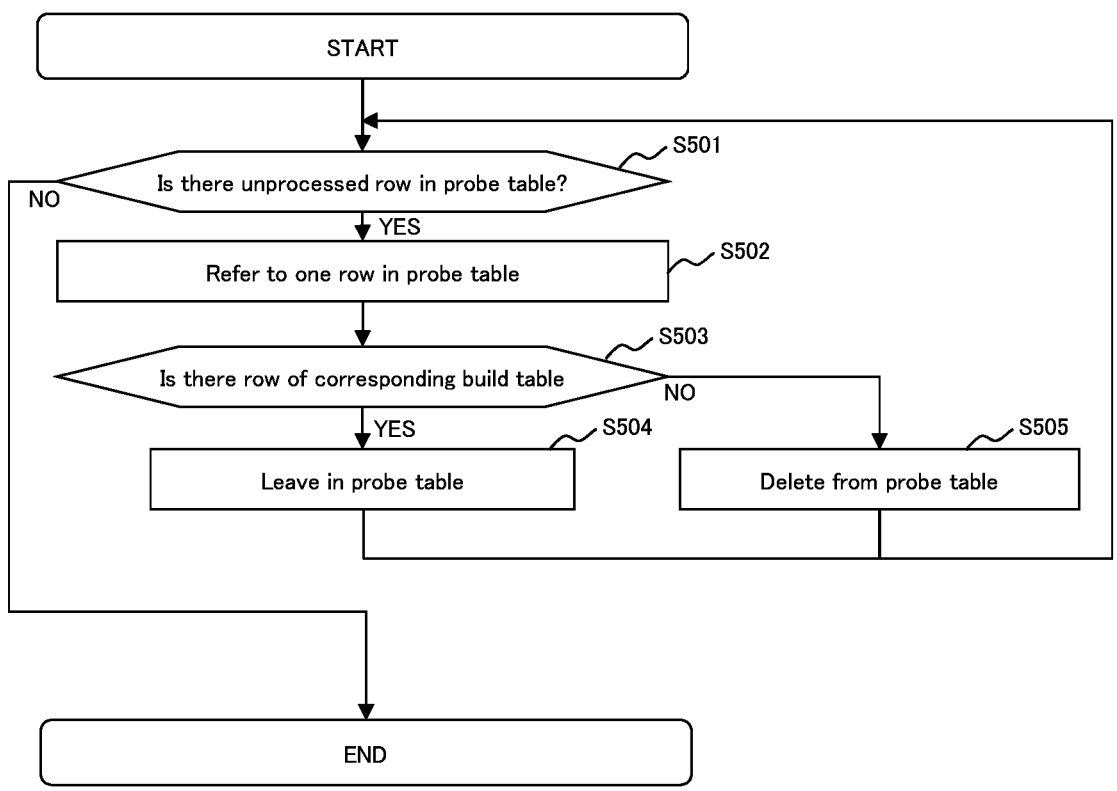
FIG. 14 is a flowchart of probe table required range determination processing according to the first embodiment.

FIG. 14 is a flowchart of the probe table required range determination processing according to the first embodiment.

The integrated bloom filter control program 160 determines whether or not there is an unprocessed row in the probe table (probe table stored in its own node) (S501), and if there is an unprocessed row (S501: YES), the integrated bloom filter control program 160 refers to one unprocessed row (referred to as a target row in this processing) in the probe table (S502).

Next, the integrated bloom filter control program 160 determines whether or not there is a row in the build table that corresponds to the target row, based on the integrated bloom filter 161 (S503). Specifically, the integrated bloom filter control program 160 calculates the bloom filter hash value (hash value of the first type, the second table hash value) by performing bloom filter hash calculation for the joining key of the target row, and determines whether a bit corresponding to the calculated bloom filter hash value is 1 or not in the integrated bloom filter 161, to determine if there is a corresponding row in the build table. In the present embodiment, since the bloom filter hash calculation is processed more lightly than the join hash calculation, the determination processing for determining whether or not there is a row in the build table that corresponds to the target row can be made lighter.

As a result, if it is determined that there is a row in the build table that corresponds to the target row (S503: YES), the integrated bloom filter control program 160 leaves the target row in the probe table (S504) and proceeds process to step S501, while if it is determined that there is no row in the build table that corresponds to the target row (S503: NO), the integrated bloom filter control program 160 deletes the target row from the probe table (S505) and proceeds process to step S501.

On the other hand, if it is determined in step S501 that there are no unprocessed rows in the probe table (S501: NO), the integrated bloom filter control program 160 ends the probe table required range determination processing.

According to this probe table required range determination processing, it is possible to delete, from the probe table stored in a node, rows that do not correspond to rows of the build table, that is, rows that are not relevant to the query, so that these rows are not transmitted to other nodes.

Next, the matching processing (S217) will be described.

Figure 15:
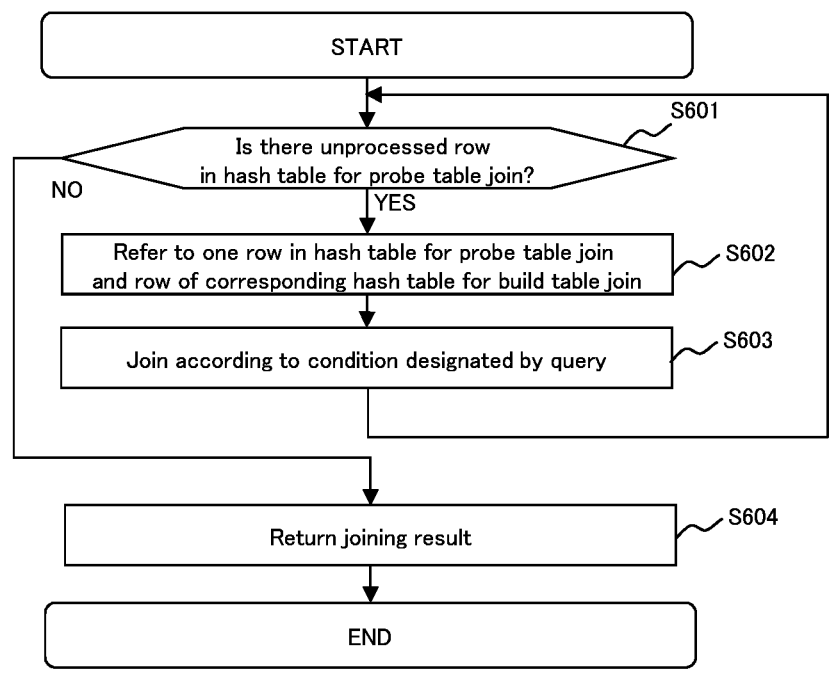
FIG. 15 is a flowchart of matching processing according to the first embodiment.

FIG. 15 is a flowchart of the matching processing according to the first embodiment.

The probe program 120 determines whether or not there is an unprocessed row in the hash table for probe table join (S601), and if there is an unprocessed row (S601: YES), the probe program 120 refers to one unprocessed row of the hash table for probe table join and one row of the corresponding hash table for build table join (S602), creates one row of the joined table by joining the items of the target row of the hash table for probe table join with the items of the corresponding one row of the hash table for build table join according to the conditions specified in the query (S603), and proceeds process to step S601.

On the other hand, if there are no unprocessed rows (S601: NO), the probe program 120 returns the joining result to the hash join request processing (S604) and ends the processing.

A computer system according to a second embodiment will be described next. The computer system according to the second embodiment is described with reference to FIG. 1, and the same reference signs are used for functional parts that are similar to those of the computer system for the first embodiment.

In the computer system 1 according to the second embodiment, the integrated bloom filter control program 160 further stores the plurality of per-node bloom filters 162 and has functions different from the integrated bloom filter control program of the computer system according to the first embodiment. The different functions of the integrated bloom filter control program are described below.

FIG. 16 is a configuration diagram of a per-node bloom filter according to the second embodiment.

The per-node bloom filter 162 (162-1, 162-2, 162-3) is a filter for determining whether or not there is a row in the build table that corresponds to the value of the target item in the probe table row in a target node, and includes a hash value row 162a, which contains join hash values (hash values of the second type) within the range that can be taken by join hash calculation for the value of a predetermined target item (target item) in the rows of the build table, and a bit row 162*b*, which indicates whether or not the build table of a target node has a row that contains the value of an item identical to the value of each of hash value rows 162*a*. In the example shown in FIG. 16, the per-node bloom filter 162-1 corresponding to the node 1 (primary node 10) stores, in the hash value row 162*a*, the range of join hash values managed by the node 1, which is 1 to 150, and the per-node bloom filter 162-2 corresponding to the node 2 (one of the secondary nodes 20) stores, in the hash value row 162*a*, the range of join hash values managed by the node 2, which is 151 to 300, and the per-node bloom filter 162-3 corresponding to a node 3 (a secondary node 20 different from the node 2) stores, in the hash value row 162*a*, the range of join hash values managed by the node 3, which is 301-450.

For example, the integrated bloom filter 161 determine whether there exist rows of the corresponding build table using the bloom filter hash value, but in the present embodiment, the bloom filter hash value has a narrower possible range than the join hash value, and hash collisions are more likely to occur. Therefore, even if it is determined by the integrated bloom filter 161 that a row of the corresponding build table exists, it may be a false positive, i.e., the corresponding build table does not actually exist. In contrast, the per-node bloom filter 162 can more accurately determine whether or not a row in the build table corresponding to the target node exists.

The processing operation for the computer system according to the second embodiment will be described next.

Figure 17:
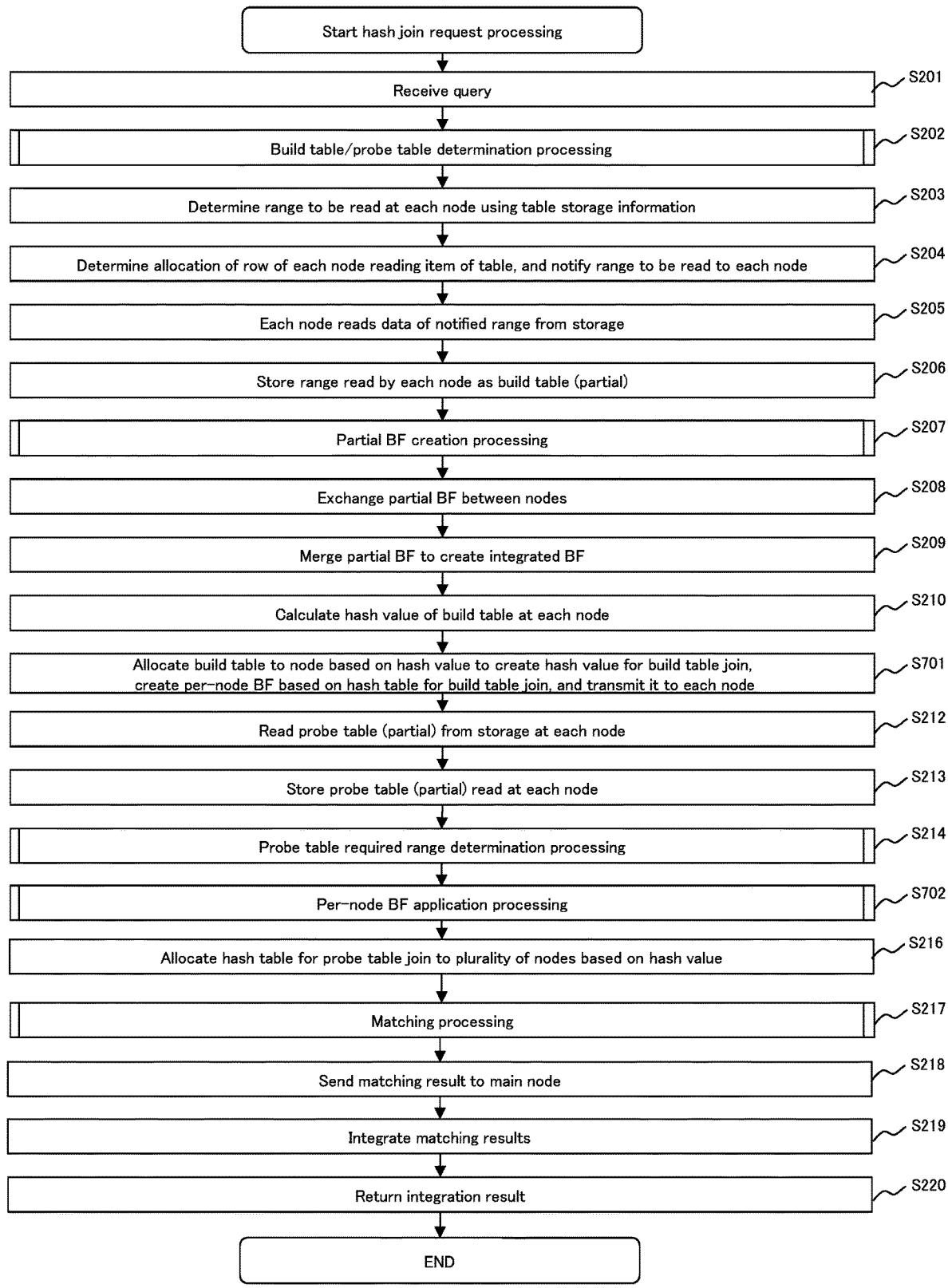
FIG. 17 is a flowchart of hash join request processing according to the second embodiment.

FIG. 17 is a flowchart of hash join request processing according to the second embodiment. The same reference signs are used for the processing steps that are similar to those of the hash join request processing according to the first embodiment shown in FIG. 11.

In step S701, the build program 110 allocates each row of the hash table for build table join 173 to a plurality of nodes by the inter-node communication program 140 based on the hash value of each row, and the build program 110 creates the hash table for build table join 173. The integrated bloom filter control program 160 then creates the per-node bloom filter 162 for that node based on the hash table for build table join 173, and transmits the per-node bloom filter 162 to the other nodes.

In step S702, the integrated bloom filter control program 160 executes per-node bloom filter application processing (see FIG. 18), which applies the per-node bloom filter 162 to each row of the probe table and narrows it down to the rows where the row of the build table that corresponds to the node exists.

The per-node bloom filter application processing (S702) will be described next.

Figure 18:
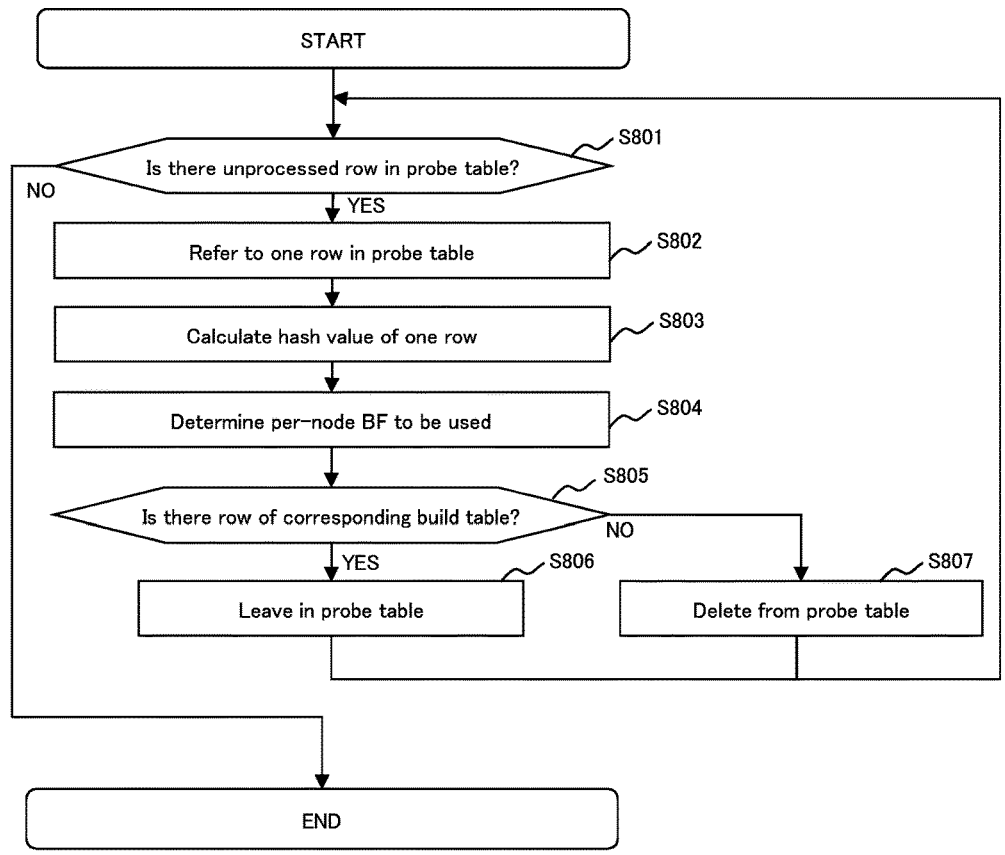
FIG. 18 is a flowchart of per-node bloom filter application processing according to the second embodiment.

FIG. 18 is a flowchart of the per-node bloom filter application processing according to the second embodiment.

The integrated bloom filter control program 160 determines whether or not there is an unprocessed row in the probe table (S801), and if there is an unprocessed row (S801: YES), the integrated bloom filter control program 160 refers to one unprocessed row in the probe table (referred to as a target row in this processing) (S802).

Next, the integrated bloom filter control program 160 performs join hash calculation on the joining key of the target row by the probe program 120 to calculate a join hash value (S803), and determines the per-node bloom filter 162 to be used, based on the calculated join hash value (S804).

Next, the integrated bloom filter control program 160 determines whether or not there is a row in the build table that corresponds to the target row, based on the determined per-node bloom filter (S805).

As a result, if it is determined that there is a row in the build table that corresponds to the target row (S805: YES), the integrated bloom filter control program 160 leaves the target row in the probe table (S806) and proceeds process to step S801, while if it is determined that there is no row in the build table that corresponds to the target row (S805: NO), the integrated bloom filter control program 160 deletes the target row from the probe table (S807) and proceeds process to step S801.

On the other hand, if it is determined in step S801 that there are no unprocessed rows in the probe table (S801: NO), the integrated bloom filter control program 160 ends the per-node bloom filter application processing.

According to this per-node bloom filter application processing, for the rows that are determined by the integrated bloom filter 161 to exist in the corresponding build table and are left in the probe table, it can determine whether or not the corresponding build table row exists in a specific node, and narrow down the probe table to only those rows of the corresponding build table that exist in a specific node, preventing unnecessary probe table rows, that is, rows for which no corresponding build table row exists, from being transferred to other nodes, and more effectively preventing unnecessary communication between nodes.

A specific example of the per-node bloom filter application processing (S702) will be described next.

Figure 19:
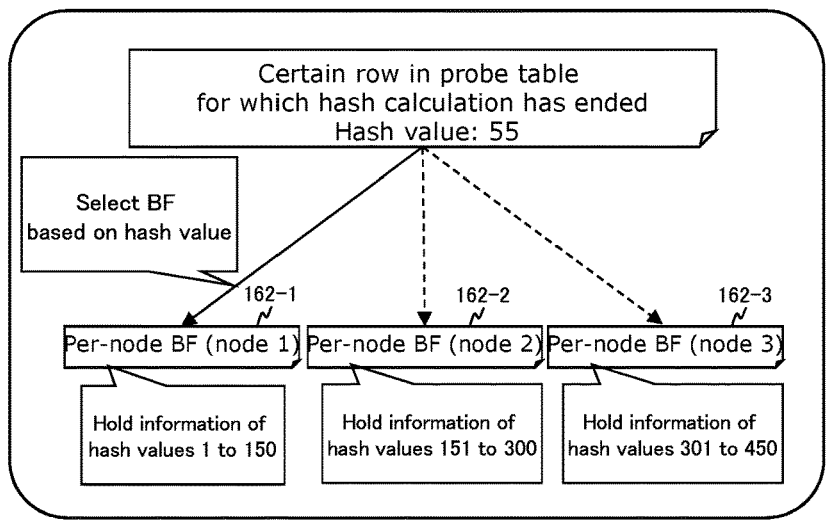
FIG. 19 is a diagram for explaining a specific example of the per-node bloom filter application processing according to the second embodiment.

FIG. 19 is a diagram for explaining a specific example of the per-node bloom filter application processing according to the second embodiment.

Here, the per-node bloom filter 162-1 for the node 1, the per-node bloom filter 162-2 for the node 2, and the per-node bloom filter 162-3 for the node 3 are managed in each node.

For example, if a join hash value of 55 is calculated for a row of the probe table in step S803, then in step S804, the per-node bloom filter 162-1 for the node 1, which includes the calculated join hash value of 55 in the managed range, is selected and used.

Note that the present invention is not limited to the foregoing embodiments and can appropriately be modified and implemented without departing from the spirit of the present invention.

For example, in the above embodiments, one of the plurality of nodes is designated as the primary node 10, but any of the plurality of nodes may be dynamically designated as the primary node.

Also, according to the above embodiments, based on the hash table for build table join 173, the per-node bloom filter 162 corresponding to the node thereof is created, and the per-node bloom filter 162 is transmitted to the other nodes, so that each node can store the per-node bloom filter 162 for all the nodes, but the present invention is not limited thereto; for example, when each node distributes each row of the hash table for build table join 173 to a plurality of nodes based on the hash value of each row, information is transmitted indicating which node is managing the hash value of each row, to each node, and each node may then create the per-node bloom filter 162 for each node based on this information.

What is claimed is:

1. A computer system, comprising:
   a storage configure to store a plurality of tables; and
   a plurality of nodes configured to process a query related to the plurality of tables,
   wherein the query is a query for joining fields of the plurality of tables according to a value of a predetermined joining key, wherein a processor of each node of the plurality of nodes is configured to:

create a bloom filter that manages information on a first table hash value, which is a hash value of a first type corresponding to a joining key of a row that corresponds to a condition of the query in rows assigned to a node in a first table having the smallest size out of tables to be joined;

integrate a plurality of bloom filters created at the plurality of nodes, to create an integrated bloom filter that manages the information on the first table hash value corresponding to the joining key of the row corresponding to the condition of the query in all the rows of the first table;

calculate a second table hash value, which is a hash value of the first type corresponding to the joining key of the row corresponding to the condition of the query in rows of a second table different from the first table to be joined; and when there exists in the integrated bloom filter the first table hash value identical to the calculated second table hash value, specify a node, out of the plurality of nodes, that stores the rows of the first table of the hash value of a second type, based on the hash value of the second type of data of the row of the second table, and transmit the data of the row of the second table to the node, and upon reception of the data of the row of the second table from another node, create a joined table by joining a field designated by the query of the row of the second table and a field designated by the query of the row of the first table corresponding to the hash value of the second type identical to the hash value of the second type of the row of the second table, and a processor of any node of the plurality of nodes is configured to:

integrate a plurality of joined tables created at respective nodes and return an integrated joined table to a request source of the query, wherein the processor of each node is configured to:

calculate the hash value of the second type of a joining key of each row assigned to its own node of the first table, and allocate data of the row of the first table assigned to its own node to each node based on the calculated hash value of the second type, wherein in the plurality of nodes, a management range is determined by dividing a range of possible hash values of the second type by a number of nodes to which the rows are assigned so that the management range of hash values of the second type for which each node is responsible is uniform, and wherein the data in the row of the first table are allocated to each node based on the management range.

2. The computer system according to claim 1, wherein in the plurality of nodes, the hash value of the first type is a hash value that requires a smaller processing load during calculation and has a narrower possible range than the hash value of the second type.

3. The computer system according to claim 2, wherein each of the processors is configured to create a per-node bloom filter that manages, for each node, the hash value of the second type of the joining key of the row of the first table managed in each node, and specify, out of the plurality of nodes, a node that stores the row of the first table corresponding to the hash value of the second type identical to the hash value of the second type, based on the hash value of the second type of the data of the row of the second table when the integrated bloom filter has the first table hash value identical to the calculated second table hash value, determine whether or not a per-node bloom filter corresponding to the specified node contains the row of the first table corresponding to the hash value of the second type identical to the hash value of the second type of the data of the row of the second table, transmit the data of the row of the second table to the node when the per-node bloom filter contains the row of the first table corresponding to the hash value of the second type identical to the hash value of the second type of the data of the row of the second table, and not to transmit the data of the row of the second table to the node when the per-node bloom filter does not contain the row of the first table corresponding to the hash value of the second type identical to the hash value of the second type of the data of the row of the second table.

4. The computer system according to claim 1, wherein the query includes selection conditions for an item of the row of the first table.

5. The computer system according to claim 1, wherein the hash value of the first type and the hash value of the second type are hash values calculated by same processing.

6. A query processing method by a computer system including a storage configured to store a plurality of tables, and a plurality of nodes configured to process a query related to the plurality of tables, the query being a query for joining fields of the plurality of tables according to a value of a predetermined joining key, the method comprising, by the computer system:

creating a bloom filter that manages information of a first table hash value, which is a hash value of a first type corresponding to a joining key of a row that corresponds to a condition of the query in rows assigned to a node in a first table having the smallest size out of tables to be joined;

integrating a plurality of bloom filters created at the plurality of nodes, to create an integrated bloom filter that manages the information on the first table hash value corresponding to the joining key of the row corresponding to the condition of the query in all the rows of the first table;

calculating a second table hash value, which is a hash value of the first type corresponding to the joining key of the row corresponding to the condition of the query in rows of a second table different from the first table to be joined; and when there exists in the integrated bloom filter the first table hash value identical to the calculated second table hash value, specifying a node, out of the plurality of nodes, that stores the rows of the first table of the hash value of a second type, based on the hash value of the second type of data of the row of the second table, and transmitting the data of the row of the second table to the node; and upon reception of the data of the row of the second table from another node, creating a joined table by joining a field designated by the query of the row of the second table and a field designated by the query of the row of the first table corresponding to the hash value of the second type identical to the hash value of the second type of the row of the second table;

integrating a plurality of joined tables created at respective nodes and returning an integrated joined table to a request source of the query;

calculating, by the processor of each node, the hash value of the second type of a joining key of each row assigned to its own node of the first table; and allocating, by the processor of each node, data of the row of the first table assigned to its own node to each node based on the calculated hash value of the second type, wherein in the plurality of nodes, a management range is determined by dividing a range of possible hash values of the second type by a number of nodes to which the rows are assigned so that the management range of hash values of the second type for which each node is responsible is uniform, and wherein the data in the row of the first table are allocated to each node based on the management range.

* * * * *